(12) United States Patent
Lee et al.

(10) Patent No.: US 11,064,474 B2
(45) Date of Patent: Jul. 13, 2021

(54) SEARCH SPACE RANDOMIZATION

(71) Applicant: QUALCOMM Incorporated, San Diego, CA (US)

(72) Inventors: Heechoon Lee, San Diego, CA (US); Jing Sun, San Diego, CA (US); Jing Jiang, San Diego, CA (US); Gabi Sarkis, San Diego, CA (US); Tao Luo, San Diego, CA (US); Peter Gaal, San Diego, CA (US); Huilin Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/270,358

(22) Filed: Feb. 7, 2019

(65) Prior Publication Data

US 2019/0261323 A1 Aug. 22, 2019

Related U.S. Application Data

(60) Provisional application No. 62/710,294, filed on Feb. 16, 2018.

(51) Int. Cl.
*H04W 72/04* (2009.01)
*H04L 25/03* (2006.01)
(Continued)

(52) U.S. Cl.
CPC ......... *H04W 72/042* (2013.01); *H04L 1/0071* (2013.01); *H04L 5/0007* (2013.01);
(Continued)

(58) Field of Classification Search
CPC .. H04W 72/042; H04L 1/0071; H04L 1/0061; H04L 5/0007; H04L 5/0048; H04L 5/0053; H04L 25/03866
See application file for complete search history.

(56) References Cited

U.S. PATENT DOCUMENTS

2013/0083753 A1 4/2013 Lee et al.
2014/0348092 A1 11/2014 Ihm et al.
(Continued)

OTHER PUBLICATIONS

Huawei et al., "On NR-PDCCH Structure", 3GPP Draft; R1-1719386, 3rd Generation Partnership Project (3GPP), Mobile Competence Centre, 650, Route Des Lucioles ; F-06921 Sophia-Antipolis Cedex, France, vol. RAN WG1, No. Reno, USA; Nov. 27, 2017-Dec. 1, 2017, Nov. 18, 2017, (Nov. 18, 2017), 7 Pages, XP051369295, Retrieved from the Internet: URL: http://www.3gpp.org/ftp/tsg_ran/WG1_RL1/TSGR1_91/Docs/ [retrieved on Nov. 18, 2017].
(Continued)

*Primary Examiner* — Kent Krueger

(57) ABSTRACT

Various aspects of the present disclosure generally relate to wireless communication. In some aspects, a wireless communication device may determine a scrambling sequence for a control channel, wherein the scrambling sequence is determined using a same identifier irrespective of whether the control channel is associated with a cell radio network temporary identifier (C-RNTI) or another type of RNTI, and wherein the scrambling sequence is determined based at least in part on an identifier associated with the wireless communication device and a value associated with an RNTI of the wireless communication device; and transmit or receive the control channel. Numerous other aspects are provided.

22 Claims, 7 Drawing Sheets

(51) Int. Cl.
*H04L 5/00* (2006.01)
*H04L 1/00* (2006.01)

(52) U.S. Cl.
CPC ...... *H04L 5/0048* (2013.01); *H04L 25/03866* (2013.01); *H04L 1/0061* (2013.01); *H04L 5/0053* (2013.01)

(56) References Cited

U.S. PATENT DOCUMENTS

| | | | |
|---|---|---|---|
| 2017/0019216 A1* | 1/2017 | Li | H04L 1/08 |
| 2017/0164395 A1* | 6/2017 | Papasakellariou | H04W 72/1273 |
| 2017/0303251 A1 | 10/2017 | Ko et al. | |

OTHER PUBLICATIONS

International Search Report and Written Opinion—PCT/US2019/017183—ISA/EPO—dated Jul. 19, 2019.
Motorola: "Interleaver Design for Control Channel Element to RE Group Mapping", 3GPP Draft; R1-073994—Interleaver for CCE to RE Group Mapping, 3rd Generation Partnership Project (3GPP), Mobile Competence Centre, 650, Route Des Lucioles ; F-06921 Sophia-Antipolis Cedex, France, vol. RAN WG1, No. Shanghai, China; Oct. 3, 2007, Oct. 3, 2007 (Oct. 3, 2007), 8 Pages, XP050107551, [retrieved on Oct. 3, 2007].
ZTE: "CCE Mapping with REG Bundling", 3GPP Draft; R1-1710104 Resource Mapping and REG Bundle, 3rd Generation Partnership Project (3GPP), Mobile Competence Centre, 650, Route Des Lucioles ; F-06921 Sophia-Antipolis Cedex, France, vol. RAN WG1, No. Qingdao. P.R. China; Jun. 27, 2017-Jun. 30, 2017, Jun. 26, 2017 (Jun. 26, 2017), 16 Pages, XP051299328, Retrieved from the Internet: URL: http://www.3gpp.org/ftp/Meetings_3GPP_SYNC/RAN1/Docs/ [retrieved on Jun. 26, 2017].
ZTE: "Consideration on Resource Configuration for Enhanced PDCCH", 3GPP Draft; R1-121053 Consideration on Resource Configuration for Enhanced PDCCH, 3rd Generation Partnership Project (3GPP), Mobile Competence Centre, 650, Route Des Lucioles, F-06921 Sophia-Antipolis Cedex, France, vol. RAN WG1. No. Jeju, Korea, Mar. 20, 2012(Mar. 20, 2012), 3 Pages, XP050599356, [retrieved on Mar. 20, 2012].
International Search Report and Written Opinion—PCT/US2019/017183—ISA/EPO—dated Apr. 29, 2019.
"LTE; Evolved Universal Terrestrial Radio Access (E-UTRA); Physical channels and modulation (3GPP TS 36.211 version 8.7.0 Release 8)", Technical Specification, European Telecommunications Standards Institute (ETSI), 650, Route Des Lucioles, F-06921 Sophia-Antipolis, France, No. V8.7.0, Jun. 1, 2009 (Jun. 1, 2009), XP014044748, pp. 1-87.

* cited by examiner

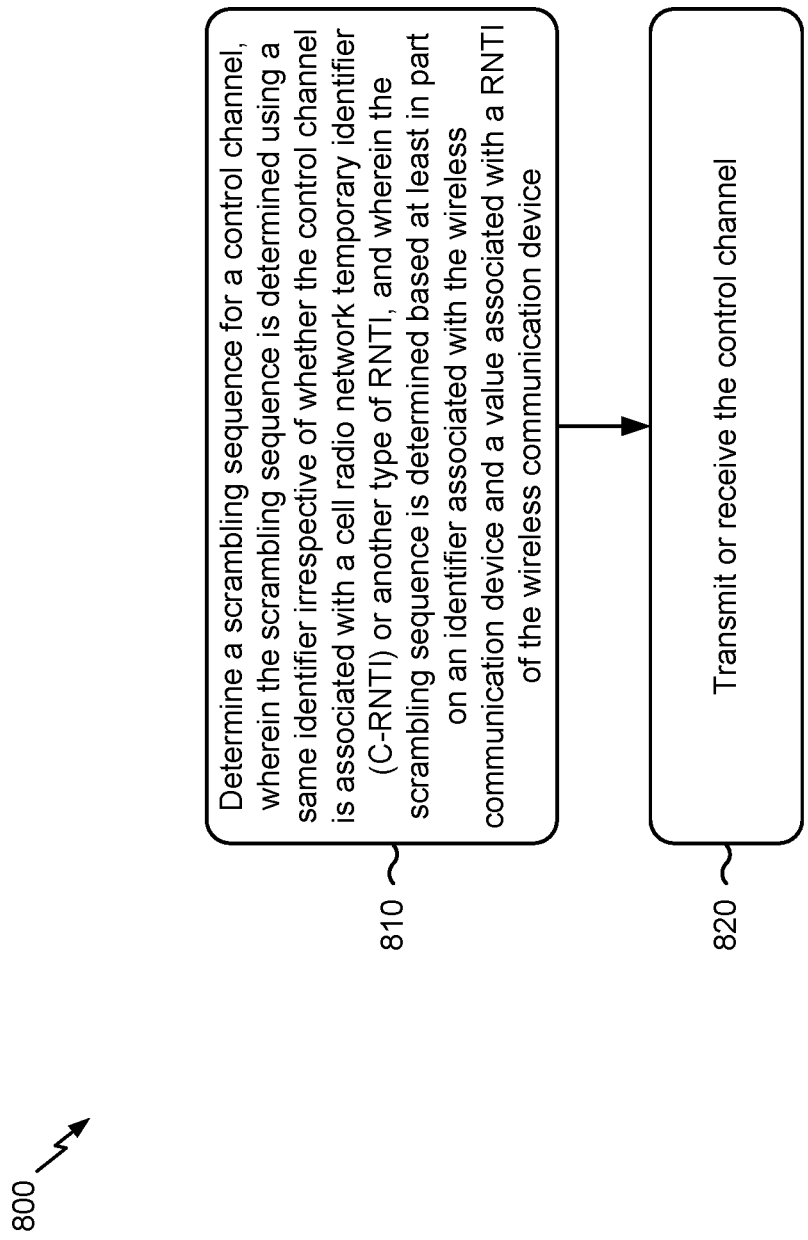

SEARCH SPACE RANDOMIZATION

CROSS-REFERENCE TO RELATED APPLICATIONS UNDER 35 U.S.C. § 119

This application claims priority to Provisional Patent Application No. 62/710,294, filed on Feb. 16, 2018, entitled "TECHNIQUES AND APPARATUSES FOR SEARCH SPACE RANDOMIZATION FOR NR PDCCH" which is hereby expressly incorporated by reference herein.

FIELD OF THE DISCLOSURE

Aspects of the present disclosure generally relate to wireless communication, and more particularly to techniques and apparatuses for search space randomization.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a wireless communication device, may include determining a control channel element to resource element group (CCE-to-REG) mapping for a control channel, wherein the CCE-to-REG mapping is determined based at least in part on a shift that is applied irrespective of whether the CCE-to-REG mapping uses an interleaved mapping or a non-interleaved mapping; and communicating control information based at least in part on the CCE-to-REG mapping.

In some aspects, a wireless communication device for wireless communication may include memory and one or more processors operatively coupled to the memory. The memory and the one or more processors may be configured to determine a control channel element to resource element group (CCE-to-REG) mapping for a control channel, wherein the CCE-to-REG mapping is determined based at least in part on a shift that is applied irrespective of whether the CCE-to-REG mapping uses an interleaved mapping or a non-interleaved mapping; and communicate control information based at least in part on the CCE-to-REG mapping.

In some aspects, a non-transitory computer-readable medium may store one or more instructions for wireless communication. The one or more instructions, when executed by one or more processors of a wireless communication device, may cause the one or more processors to determine a CCE-to-REG mapping for a control channel, wherein the CCE-to-REG mapping is determined based at least in part on a shift that is applied irrespective of whether the CCE-to-REG mapping uses an interleaved mapping or a non-interleaved mapping; and communicate control information based at least in part on the CCE-to-REG mapping.

In some aspects, an apparatus for wireless communication may include means for determining a CCE-to-REG mapping for a control channel, wherein the CCE-to-REG mapping is determined based at least in part on a shift that is applied irrespective of whether the CCE-to-REG mapping uses an interleaved mapping or a non-interleaved mapping; and means for communicating control information based at least in part on the CCE-to-REG mapping.

In some aspects, a method of wireless communication, performed by a wireless communication device, may include determining a scrambling sequence for a control channel, wherein the scrambling sequence is determined using a same identifier irrespective of whether the control channel is associated with a cell radio network temporary identifier (C-RNTI) or another type of RNTI, and wherein the scrambling sequence is determined based at least in part on an identifier associated with the wireless communication device and a value associated with an RNTI of the wireless communication device; and transmitting or receiving the control channel.

In some aspects, a wireless communication device for wireless communication may include memory and one or more processors operatively coupled to the memory. The memory and the one or more processors may be configured to determine a scrambling sequence for a control channel, wherein the scrambling sequence is determined using a same identifier irrespective of whether the control channel is associated with a C-RNTI or another type of RNTI, and wherein the scrambling sequence is determined based at least in part on an identifier associated with the wireless communication device and a value associated with an RNTI of the wireless communication device; and transmit or receive the control channel.

In some aspects, a non-transitory computer-readable medium may store one or more instructions for wireless communication. The one or more instructions, when executed by one or more processors of a wireless communication device, may cause the one or more processors to determine a scrambling sequence for a control channel, wherein the scrambling sequence is determined using a same identifier irrespective of whether the control channel is associated with a C-RNTI or another type of RNTI, and wherein the scrambling sequence is determined based at least in part on an identifier associated with the wireless communication device and a value associated with an RNTI of the wireless communication device; and transmit or receive the control channel.

In some aspects, an apparatus for wireless communication may include means for determining a scrambling sequence for a control channel, wherein the scrambling sequence is determined using a same identifier irrespective of whether the control channel is associated with a C-RNTI or another type of RNTI, and wherein the scrambling sequence is determined based at least in part on an identifier associated with the apparatus and a value associated with an RNTI of the apparatus; and means transmitting or receiving the control channel.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It should be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8 is a diagram illustrating an example process performed, for example, by a wireless communication device, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
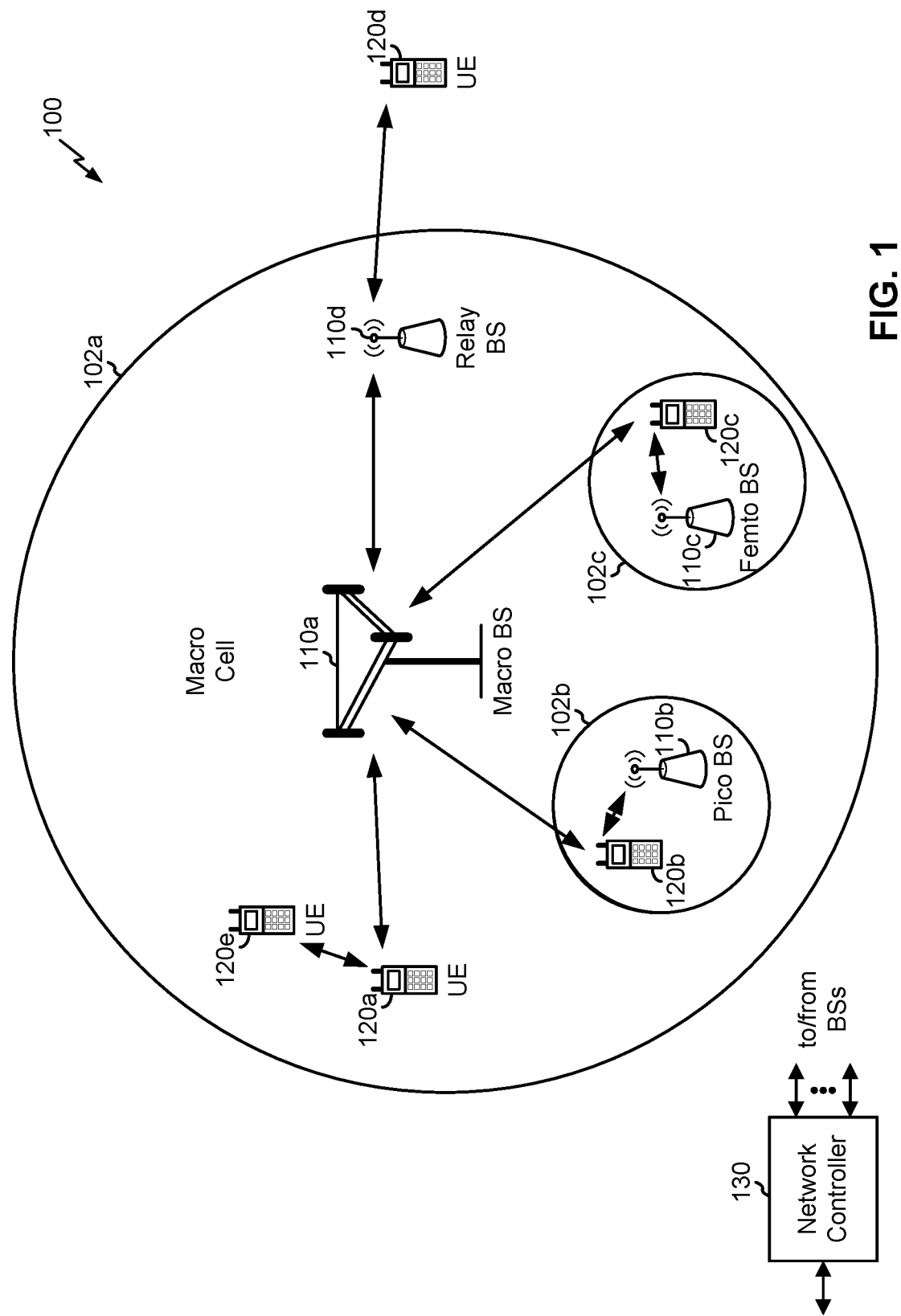
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a BS 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the BS 110.

As indicated above, FIG. 1 is provided merely as an example. Other examples may differ from what is described with regard to FIG. 1.

Figure 2:
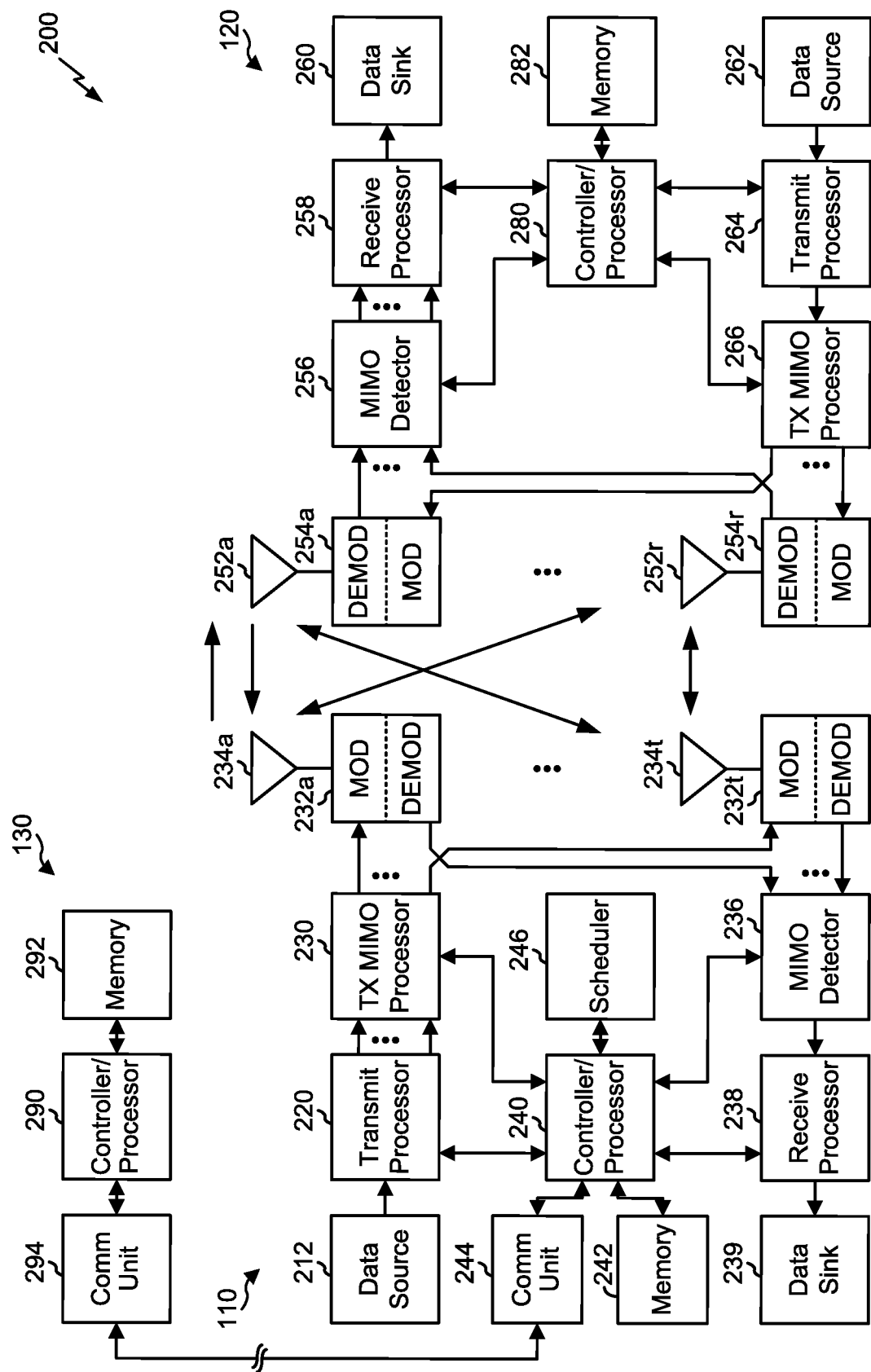
FIG. 2 is a block diagram conceptually illustrating an example of a base station in communication with a UE in a wireless communication network, in accordance with various aspects of the present disclosure.

FIG. 2 shows a block diagram of a design 200 of BS 110 and UE 120, which may be one of the base stations and one of the UEs in FIG. 1. BS 110 may be equipped with T antennas 234a through 234t, and UE 120 may be equipped with R antennas 252a through 252r, where in general $T \geq 1$ and $R \geq 1$.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of BS 110, controller/processor 280 of UE 120, and/or any other component(s) of FIG. 2 may perform one or more techniques associated with search space randomization, as described in more detail elsewhere herein. For example, controller/processor 240 of BS 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for BS 110 and UE 120, respectively. A scheduler 246 may schedule UEs for data transmission on the downlink and/or uplink.

In some aspects, a wireless communication device (e.g., BS 110 or UE 120) may include means for determining a control channel element to resource element group (CCE-to-REG) mapping for a control channel, wherein the CCE-to-REG mapping is determined based at least in part on a shift that is applied irrespective of whether the CCE-to-REG mapping uses an interleaved mapping or a non-interleaved mapping; means for communicating control information based at least in part on the CCE-to-REG mapping; means for determining a scrambling sequence for a control channel, wherein the scrambling sequence is determined using a same identifier irrespective of whether the control channel is associated with a cell radio network temporary identifier (C-RNTI) or another type of RNTI, and wherein the scrambling sequence is determined based at least in part on an identifier associated with the wireless communication device and a value associated with an RNTI of the wireless communication device; means for transmitting or receiving the control channel; and/or the like. In some aspects, such means may include one or more components of BS 110 or UE 120 described in connection with FIG. 2.

As indicated above, FIG. 2 is provided merely as an example. Other examples may differ from what is described with regard to FIG. 2.

Figure 3:
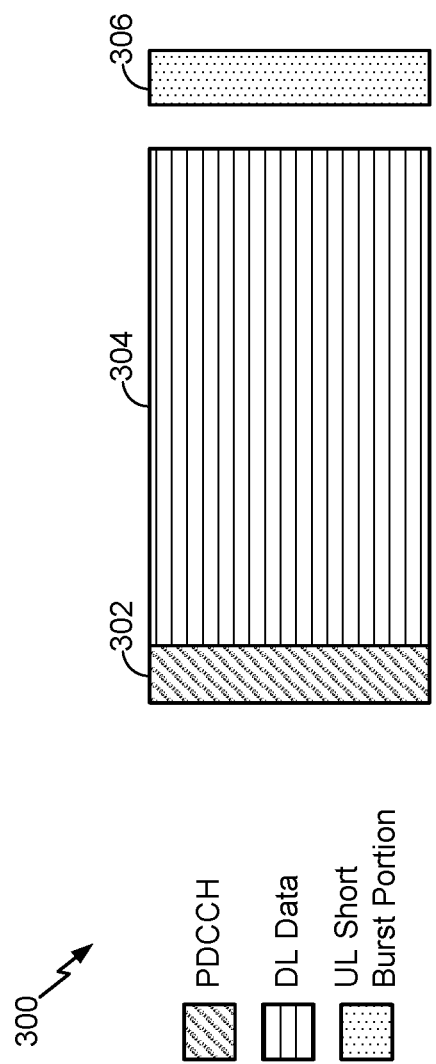
FIG. 3 is a diagram illustrating an example of a downlink (DL)-centric subframe, in accordance with various aspects of the present disclosure.

FIG. 3 is a diagram 300 showing an example of a DL-centric subframe or wireless communication structure. The DL-centric subframe may include a control portion 302. The control portion 302 may exist in the initial or beginning portion of the DL-centric subframe. The control portion 302 may include various scheduling information and/or control information corresponding to various portions of the DL-centric subframe. In some configurations, the control portion 302 may be a physical DL control channel (PDCCH), as indicated in FIG. 3. In some aspects, the control portion 302 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, and/or the like), and/or the like.

The DL-centric subframe may also include a DL data portion 304. The DL data portion 304 may sometimes be referred to as the payload of the DL-centric subframe. The DL data portion 304 may include the communication resources utilized to communicate DL data from the scheduling entity (e.g., UE or BS) to the subordinate entity (e.g., UE). In some configurations, the DL data portion 304 may be a physical DL shared channel (PDSCH).

The DL-centric subframe may also include an UL short burst portion 306. The UL short burst portion 306 may sometimes be referred to as an UL burst, an UL burst portion, a common UL burst, a short burst, an UL short burst, a common UL short burst, a common UL short burst portion, and/or various other suitable terms. In some aspects, the UL short burst portion 306 may include one or more reference signals. Additionally, or alternatively, the UL short burst portion 306 may include feedback information corresponding to various other portions of the DL-centric subframe. For example, the UL short burst portion 306 may include feedback information corresponding to the control portion 302 and/or the data portion 304. Non-limiting examples of information that may be included in the UL short burst portion 306 include an acknowledgment (ACK) signal (e.g., a physical uplink control channel (PUCCH) ACK, a physical uplink shared channel (PUSCH) ACK, an immediate ACK), a negative ACK (NACK) signal (e.g., a PUCCH NACK, a PUSCH NACK, an immediate NACK), a scheduling request (SR), a buffer status report (BSR), a hybrid automatic repeat request (HARD) indicator, a channel state indication (CSI), a channel quality indicator (CQI), a sounding reference signal (SRS), a demodulation reference signal (DMRS), PUSCH data, and/or various other suitable types of information. The UL short burst portion 306 may include additional or alternative information, such as information pertaining to random access channel (RACH) procedures, scheduling requests, and various other suitable types of information.

As illustrated in FIG. 3, the end of the DL data portion 304 may be separated in time from the beginning of the UL short burst portion 306. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 3 is provided merely as an example. Other examples may differ from what is described with regard to FIG. 3.

Figure 4:
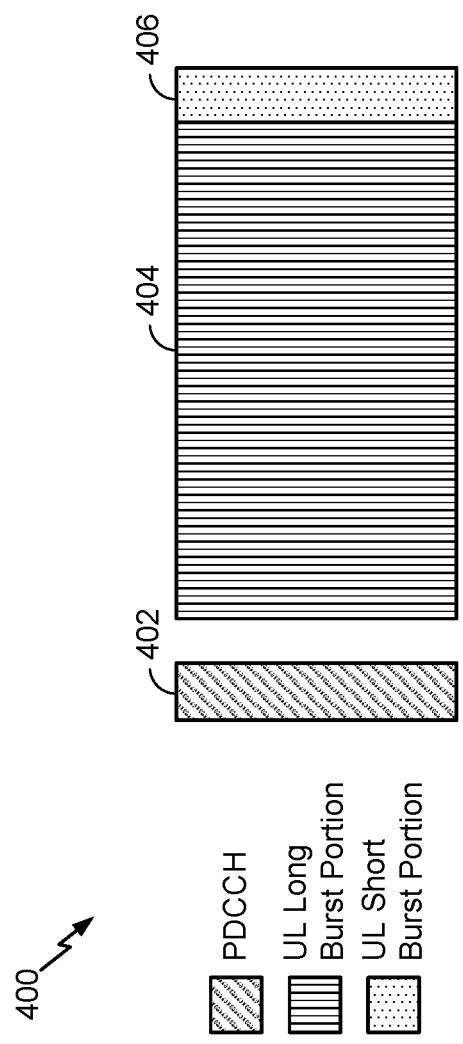
FIG. 4 is a diagram illustrating an example of an uplink (UL)-centric subframe, in accordance with various aspects of the present disclosure.

FIG. 4 is a diagram 400 showing an example of an UL-centric subframe or wireless communication structure. The UL-centric subframe may include a control portion 402. The control portion 402 may exist in the initial or beginning portion of the UL-centric subframe. The control portion 402 in FIG. 4 may be similar to the control portion 302 described above with reference to FIG. 3. The UL-centric subframe may also include an UL long burst portion 404. The UL long burst portion 404 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 402 may be a physical DL control channel (PDCCH).

As illustrated in FIG. 4, the end of the control portion 402 may be separated in time from the beginning of the UL long burst portion 404. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include an UL short burst portion 406. The UL short burst portion 406 in FIG. 4 may be similar to the UL short burst portion 306 described above with reference to FIG. 3, and may include any of the information described above in connection with FIG. 3. The foregoing is merely one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a "sidelink" signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some aspects, the sidelink signals may be communicated using a licensed spectrum (unlike wireless local area networks, which typically use an unlicensed spectrum).

In one example, a wireless communication structure, such as a frame, may include both UL-centric subframes and DL-centric subframes. In this example, the ratio of UL-centric subframes to DL-centric subframes in a frame may be dynamically adjusted based at least in part on the amount of UL data and the amount of DL data that are transmitted. For example, if there is more UL data, then the ratio of UL-centric subframes to DL-centric subframes may be increased. Conversely, if there is more DL data, then the ratio of UL-centric subframes to DL-centric subframes may be decreased.

As indicated above, FIG. 4 is provided merely as an example. Other examples may differ from what is described with regard to FIG. 4.

In a NR network, a base station transmits a PDCCH (e.g., including control information, such as downlink control information (DCI)) based at least in part on a search space set. A given search space set defines candidates that may carry a PDCCH within the search space set, where each candidate is associated with one or more control channel elements (CCEs). A CCE may be composed of multiple resource element groups (REGs). A REG may include one resource block and one OFDM symbol. One or more search space sets may be associated with a control resource set (CORESET). In a NR network, a base station may flexibly schedule and transmit the PDCCH. In other words, transmission of the PDCCH in the NR network is not limited to a particular set of frequency resources and/or time resources in a given radio frame, as in the case of, for example, a LTE network.

PDCCH frequency domain and time domain resources are configured on a per CORESET basis. Thus, once a UE is configured with a CORESET, the UE has information that identifies which resource blocks in the frequency domain are assigned to a search space set associated with the CORESET, as well as information that identifies a number of consecutive symbols occupied by the search space set. A PDCCH location in the time domain may be configured on a per search space set basis. Here, for a given search space set associated with a CORESET, the UE is configured with information that identifies a monitoring periodicity associated with the search space set (e.g., information indicating that the search space set should be monitored once every X (X≥1) slots), information that identifies a monitoring offset (e.g., information that identifies that a particular slot, of each X slots, that the UE is to monitor), and information that identifies a monitoring pattern (e.g., information that identifies a first symbol of the search space set within the particular slot). Thus, the UE may be configured with information that allows the UE to identify resources of the search space set in both the frequency domain and the time domain, and the base station may transmit a PDCCH in one or more candidates in the search space set.

In order to receive a PDCCH associated with one or more candidates of a given UE-specific search space set (i.e., a search space set that may carry control information specific to one or more particular UEs), a UE may attempt to decode a PDCCH in candidates of the search space set. However, the locations of candidates across search space sets may be varied when transmitted by the base station (e.g., in order to avoid PDCCH collisions among neighboring cells, in order to avoid patterned PDCCH transmissions, and/or the like). Thus, the UE needs to identify a location of a given candidate before attempting to decode the PDCCH.

In some cases, the UE identifies a location of a candidate in a search space set based on determining one or more CCE indices that correspond to one or more CCEs associated with the candidate. Here, a given CCE index is determined partially based at least in part on a hash value ($Y_{p,k}$), where the hash value is computed based on a hash function using a hash value index (k). The hash function is designed to allow the UE to identify locations of candidates when the locations are varied across search space sets.

Generally, for a search space set in a CORESET p, a hash value $Y_{p,k}$ is computed based on the following function:

$$Y_{p,k}=(A_p \times Y_{p,k-1}) \bmod D$$

where k is the hash value index (sometimes referred to as an index of the hash value), $A_p$ is an integer corresponding to CORESET p, and D is an integer number. As indicated, a given hash value is computed partially on a hash value associated with a preceding hash value index. Typically, an integer $Y_{p,-1}$ may be used to compute an initial hash value (e.g., $Y_{p,0}=(A_p \times Y_{p,-1}) \bmod D$), and other hash values may be computed based on updating (e.g., incrementing) the hash value index. Based on computing a given hash value, the UE may determine one or more CCE indices associated with the candidate, and may attempt to decode the PDCCH (e.g., using a blind decoding procedure).

In some aspects, the transmitting entity may scramble the PDCCH. Scrambling the PDCCH may further increase randomization of the PDCCH and allow for decoding of the PDCCH by a recipient of the PDCCH. For example, the scrambling sequence generator may be initialized with $c_{init}=n_{RNTI} \ast 2^{16}+n_{ID}$. $n_{ID}$ may be from the set {0, 1, . . . , 65535} and may be the higher-layer parameter Control-scrambling-Identity if configured, and if the radio network temporary identifier (RNTI) associated with the PDCCH transmission is the cell RNTI (C-RNTI), and may be equal to $N_{ID}^{cell}$ otherwise. $n_{RNTI}$ may be given by the C-RNTI for a PDCCH in a UE-specific search space and may be 0 for a PDCCH in a common search space.

A goal of scrambling and randomization of the PDCCH and the CCE-to-REG mapping is to reduce interference between cells. However, some of the randomization and hashing techniques described above may not reduce interference to a sufficient degree. In other words, there is room for further randomization and/or scrambling to further reduce interference between cells.

Some techniques and apparatuses described herein provide randomization and scrambling procedures for CCE-to-REG mapping and/or PDCCH scrambling, which may reduce interference between cells while simplifying decoding and/or determination of the CCE-to-REG mapping. For example, some techniques and apparatuses described herein may provide increased randomization of the CCE-to-REG mapping based at least in part on a shift applied to the CCE-to-REG mapping irrespective of whether the mapping is an interleaved mapping or a non-interleaved mapping, thereby reducing the likelihood of collision or interference between PDCCHs of different cells. As another example, some techniques and apparatuses described herein provide PDCCH scrambling based at least in part on a simpler approach than the scrambling approach described above while preserving the randomness of the output, thereby conserving processing resources of the transmitting device and the decoding device.

Figure 5:
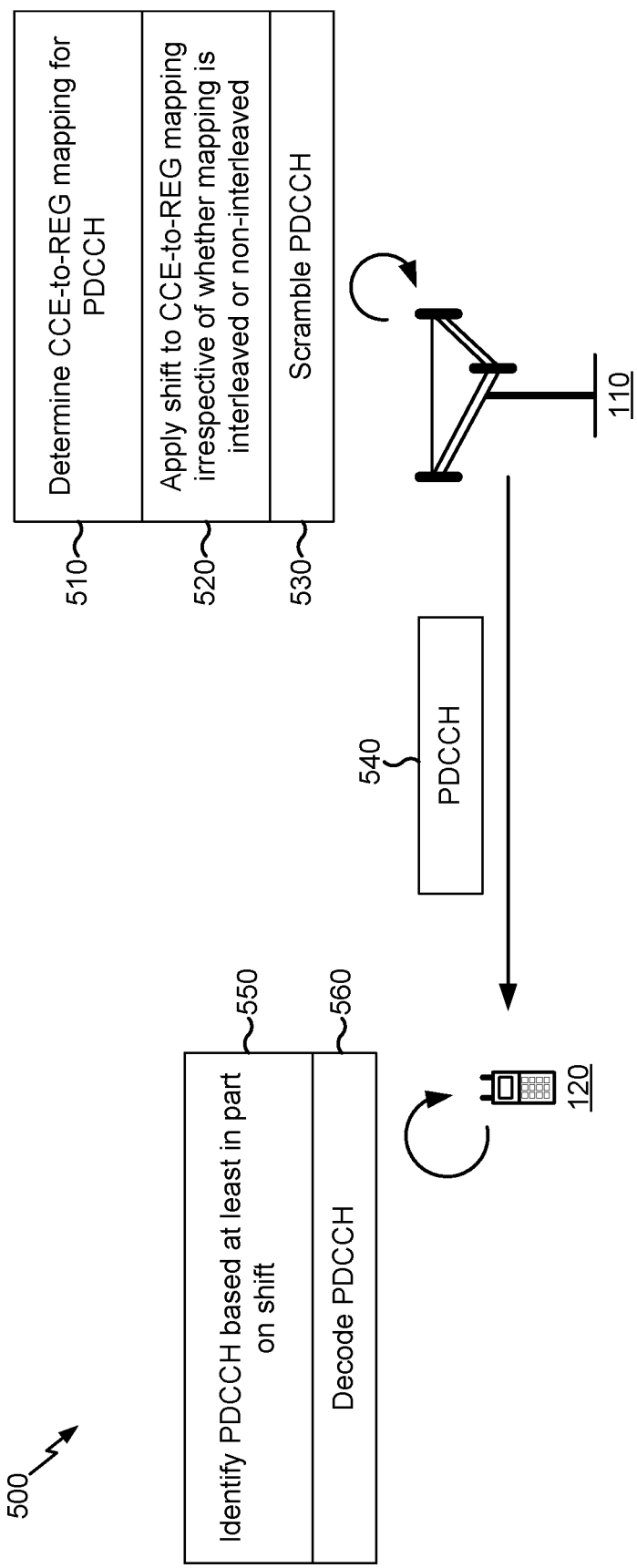
FIG. 5 is a diagram illustrating an example of determining a control channel element to resource element group mapping using a shift, in accordance with various aspects of the present disclosure.

FIG. 5 is a diagram illustrating an example 500 of determining a control channel element to resource element group mapping using a shift, in accordance with various aspects of the present disclosure. FIG. 5 shows a BS 110 that transmits a PDCCH to a UE 120. In this case, the BS 110 and/or the UE 120 may be the wireless communication device described herein.

As shown by reference number 510, the BS 110 may determine a CCE-to-REG mapping for a PDCCH to be transmitted to the UE 120. For example, the CCE-to-REG mapping may identify a mapping of CCEs of the PDCCH to resource element groups (e.g., REGs) for a CORESET to be transmitted to the UE 120. In 5G/NR, the CCE-to-REG mapping is more flexible than in 4G/LTE. Therefore, the BS 110 and the UE 120 may need to have a common understanding of how to determine the CCE-to-REG mapping for successful transmission and decoding of the PDCCH.

In some aspects, the CCE-to-REG mapping may be an interleaved mapping. In such a case, the BS 110 may apply a row/column rectangular interleaver using a unit of a REG-bundle. A number of rows of the bundle may be selected from a set of values (e.g., {2, 3, 6} or a different set). A number of columns may be determined based at least in part on a number of interleaving units for a given CORESET divided by the number of rows of the bundle. To interleave the CORESET, the BS 110 may write into a rectangular interleaver by rows and read from the rectangular interleaver by columns. A shift (e.g., a cyclic shift) of the interleaving unit may be applied based at least in part on a configurable identifier, which may be an independent parameter from the configurable identifier for demodulation reference signals. The value range of the configurable identifier may be, for example, {0:274}. For a CORESET configured by physical broadcast channel or remaining minimum system information, a physical cell identifier may be used for the cyclic shift of the interleaving unit.

As shown by reference number 520, the BS 110 may apply a shift to the CCE-to-REG mapping irrespective of whether the mapping is interleaved (as described above) or non-interleaved. For example, the shift may be based at least in part on the configurable identifier and a time domain parameter. In some aspects, the time domain parameter may include, for example, a slot index, a symbol index, a system frame number, a subframe number, and/or the like. The introduction of the time-domain parameter may provide increased randomization of the CCE-to-REG mapping by providing a time-varying shift value in comparison to a fixed shift based at least in part on the configurable identifier. In some aspects, the shift may be determined based at least in part on a product of the time domain parameter and the configurable identifier, which may create a random shift pattern using a pair of identifiers (e.g., the time domain parameter and the configurable identifier). In this way, randomness of the CCE-to-REG mapping may be further increased, thereby reducing inter-cell interference of the PDCCH.

In some aspects, the BS 110 may not apply the shift irrespective of whether the mapping is interleaved or non-interleaved. For example, the BS 110 may determine the shift only for an interleaved mapping based at least in part on the time-domain parameter and/or the configurable identifier. This may conserve processor resources that would be used to apply the shift with regard to a non-interleaved mapping.

As shown by reference number 530, the BS 110 may scramble the PDCCH, as described in more detail in connection with FIG. 6, below. In some aspects, the techniques described in connection with FIGS. 5 and 6 may be performed in combination. For example, the BS 110 and/or the UE 120 may determine a CCE-to-REG mapping based at least in part on a shift, irrespective of whether the CORESET is to be interleaved or non-interleaved, as well as scrambling the PDCCH based at least in part on the techniques described in connection with FIG. 6, below. In this way, randomization of the PDCCH may be further improved.

As shown by reference number 540, the BS 110 may transmit the PDCCH to the UE 120. For example, the BS 110 may transmit the PDCCH in a common search space or a UE-specific search space associated with the UE 120. By mapping a CORESET of the PDCCH to physical resources using the shift, randomness of the mapping is improved, thus reducing the likelihood of interference with PDCCHs of neighboring cells.

As shown by reference number 550, the UE 120 may identify the PDCCH based at least in part on the shift. For example, the UE 120 may know which technique is used to apply the shift (e.g., based at least in part on configuration information, control information, a physical broadcast channel, and/or the like) and may use the technique to determine the shift applied to the CCE-to-REG mapping. Thus, the UE 120 may know which resources are used to transmit the PDCCH, and may identify the PDCCH with regard to the resources used to transmit the PDCCH. As shown by reference number 560, the UE 120 may decode the PDCCH.

As indicated above, FIG. 5 is provided as an example. Other examples may differ from what is described with respect to FIG. 5.

Figure 6:
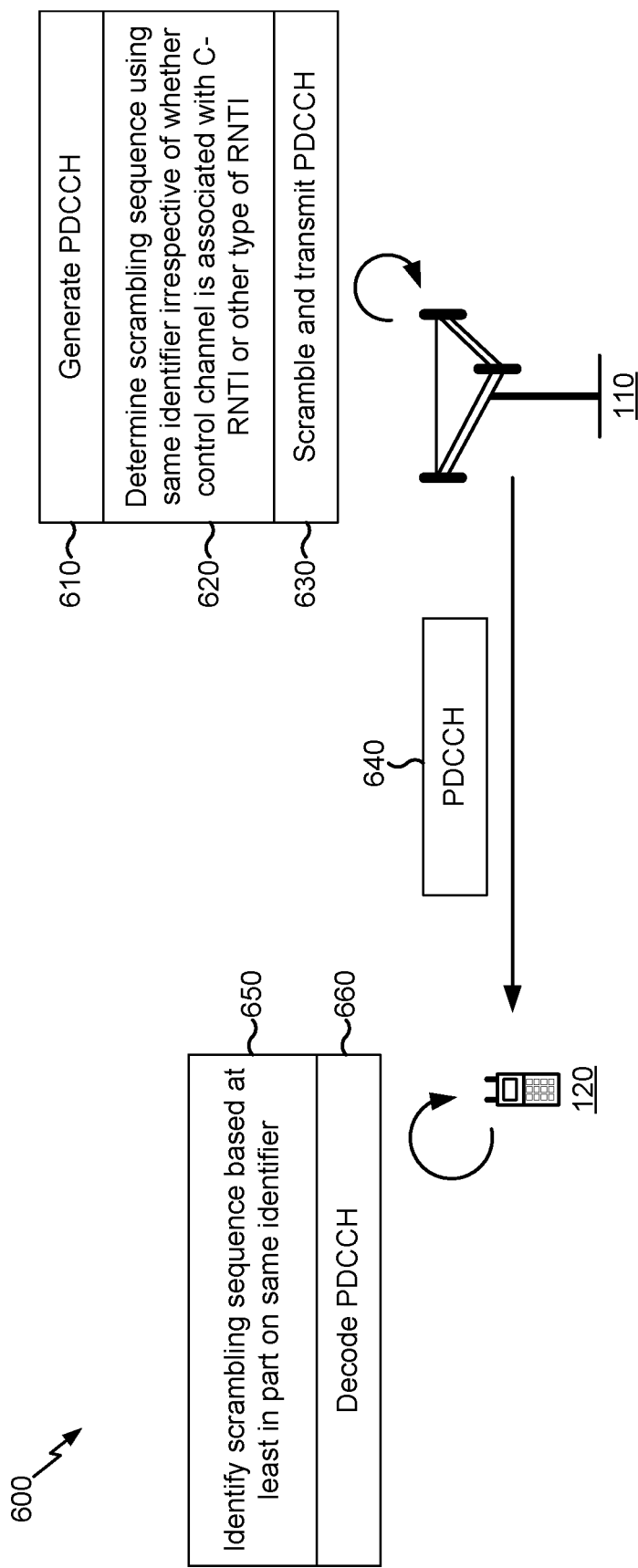
FIG. 6 is a diagram illustrating an example of determining a control channel scrambling sequence, in accordance with various aspects of the present disclosure.

FIG. 6 is a diagram illustrating an example 600 of determining a control channel scrambling sequence, in accordance with various aspects of the present disclosure. FIG. 6 shows a BS 110 that transmits a PDCCH to a UE 120. In this case, the BS 110 and/or the UE 120 may be the wireless communication device described herein.

As shown by reference number 610, the BS 110 may generate a PDCCH. For example, the PDCCH may include control information for the UE 120. In some aspects, the BS 110 may determine a CCE-to-REG mapping of the PDCCH using the techniques described in connection with FIG. 5, above. For example, the BS 110 may determine the CCE-to-REG mapping before scrambling is performed or after scrambling is performed.

The BS 110 may determine a scrambling sequence for the PDCCH. The scrambling sequence may be used to scramble the PDCCH (e.g., a cyclic redundancy check (CRC) of the PDCCH) for the UE 120. To determine the scrambling sequence, the BS 110 may initialize a scrambling sequence generator using certain parameters based at least in part on whether the PDCCH is to be transmitted in a common search space (CSS) or a UE-specific search space (UESS). For example, in a legacy approach, the BS 110 may initialize the scrambling sequence generator based at least in part on whether the UE 120 is associated with a C-RNTI or another type of RNTI. More specifically, and as described above, the scrambling sequence generator may be initialized using $c_{init}=n_{RNTI}*2^{16}+n_{ID}$, wherein $c_{init}$ is the initialized value.

Continuing with the description of the above approach, for a PDCCH to be transmitted in a CSS and C-RNTI, $n_{ID}$ may be equal to a value of Control-scrambling-Identity if configured and $n_{RNTI}$ may be equal to 0. In some aspects, Control-scrambling-Identity may be pdcch-DMRS-ScramblingID of 3GPP Technical Specification 38.211. $n_{ID}$ may be referred to herein as an identifier associated with the UE 120, and $n_{RNTI}$ may be referred to as a value associated with an RNTI of the UE 120. If Control-scrambling-Identity is not configured, $n_{ID}$ may be equal to a cell identifier of the BS 110 and $n_{RNTI}$ may be equal to 0. For another type of RNTI, $n_{ID}$ may be equal to the cell identifier and $n_{RNTI}$ may be equal to 0. For a PDCCH to be transmitted in a UESS and C-RNTI, $n_{ID}$ may be equal to the value of Control-scrambling-Identity if configured and $n_{RNTI}$ may be equal to a value of the C-RNTI. If Control-scrambling-Identity is not configured, $n_{ID}$ may be equal to the cell identifier and $n_{RNTI}$ may be a value of the C-RNTI. For another type of RNTI, $n_{ID}$ may be equal to the cell identifier and $n_{RNTI}$ may be the C-RNTI. However, this may require multiple decoding attempts for hypotheses using different RNTIs (e.g., C-RNTI vs. other RNTI) for both CSS and UESS when control-scrambling-identity is configured. This consumes resources of a receiving wireless communication device. Furthermore, CSS and UESS can also be configured for the same CORESET, thus further increasing processing resource usage.

As shown by reference number 620, the BS 110 may determine a scrambling sequence using the same identifier, irrespective of whether the control channel (e.g., the PDCCH) is associated with (e.g., to be generated using) a C-RNTI or another type of RNTI. The techniques and apparatuses described herein reduce processor usage by using the same identifier values irrespective of whether the C-RNTI or the other RNTI is used. For example, since RNTI-based scrambling is already performed for channel encoding, there is no need to have additional RNTI-based scrambling in modulation. Furthermore, the UESS is still permitted to be based at least in part on a configured identifier (described below), which may be different from the cell identifier. Thus, the same scrambling is used across different RNTIs to avoid multiple blind decoding attempts, thereby conserving decoding resources of the receiving wireless communication device (e.g., UE 120 or another device).

In some aspects, for a PDCCH to be transmitted in the CSS, $n_{ID}$ may be a cell identifier of the BS 110 for the C-RNTI and for the other RNTI. For a PDCCH to be transmitted in the UESS, $n_{ID}$ may be a configured identifier, when the configured identifier has been configured, and may be equal to the cell identifier otherwise, for the C-RNTI and the other RNTI.

In some aspects, the BS 110 may initialize the scrambling sequence generator based at least in part on whether the PDCCH is to be transmitted in a CSS associated with a CORESET configured by a physical broadcast channel, or a CSS associated with another CORESET. For the PDCCH to be transmitted in a CSS associated with a CORESET configured by a physical broadcast channel, $n_{ID}$ may be equal to the cell identifier irrespective of whether the UE 120 is associated with a C-RNTI or another type of RNTI. For a PDCCH to be transmitted in a CSS associated with another CORESET, $n_{ID}$ may be equal to a configured identifier when the configured identifier has been configured, and may be the cell identifier otherwise. For a PDCCH to be transmitted in the UESS, $n_{ID}$ may be equal to a configured identifier when the configured identifier has been configured, and may be the cell identifier otherwise. The above cases may be applicable irrespective of whether the UE 120 is associated with the C-RNTI or the other RNTI. This allows scrambling to be configurable for CSS other than the initial CSS for initial access (e.g., the CSS configured by the physical broadcast channel), which may need to be available for the UE 120 before initial configuration.

In some aspects, RNTI-based scrambling of the PDCCH may occur before modulation. In such a case, for a PDCCH to be transmitted in the CSS, $n_{ID}$ may be equal to the cell identifier and $n_{RNTI}=0$. For a PDCCH to be transmitted in the UESS, nip may be equal to a configured identifier when the Control-scrambling-Identity has been configured, and may be the cell identifier otherwise. In such a case, $n_{RNTI}$ may be equal to the C-RNTI irrespective of whether the Control-scrambling-Identity has been configured. The above cases may be applicable irrespective of whether the UE 120 is associated with the C-RNTI or the other RNTI.

As shown by reference number 630, the BS 110 may scramble and transmit the PDCCH. For example, the BS 110 may scramble the PDCCH using the scrambling sequence determined in connection with reference number 620. As shown by reference number 640, the BS 110 may transmit the PDCCH to the UE 120. As shown by reference number 650, the UE 120 may identify the scrambling sequence based at least in part on the same identifier described in connection with reference number 620. For example, the UE 120 may determine the scrambling sequence, or a value for descrambling the scrambling sequence, based at least in part on the $n_{ID}$ and/or $n_{RNTI}$ used to generate the scrambling sequence. As shown by reference number 660, the UE 120 may decode (e.g., descramble, demodulate, receive, detect using blind decoding, etc.) the PDCCH.

As indicated above, FIG. 6 is provided as an example. Other examples may differ from what is described with respect to FIG. 6.

Figure 7:
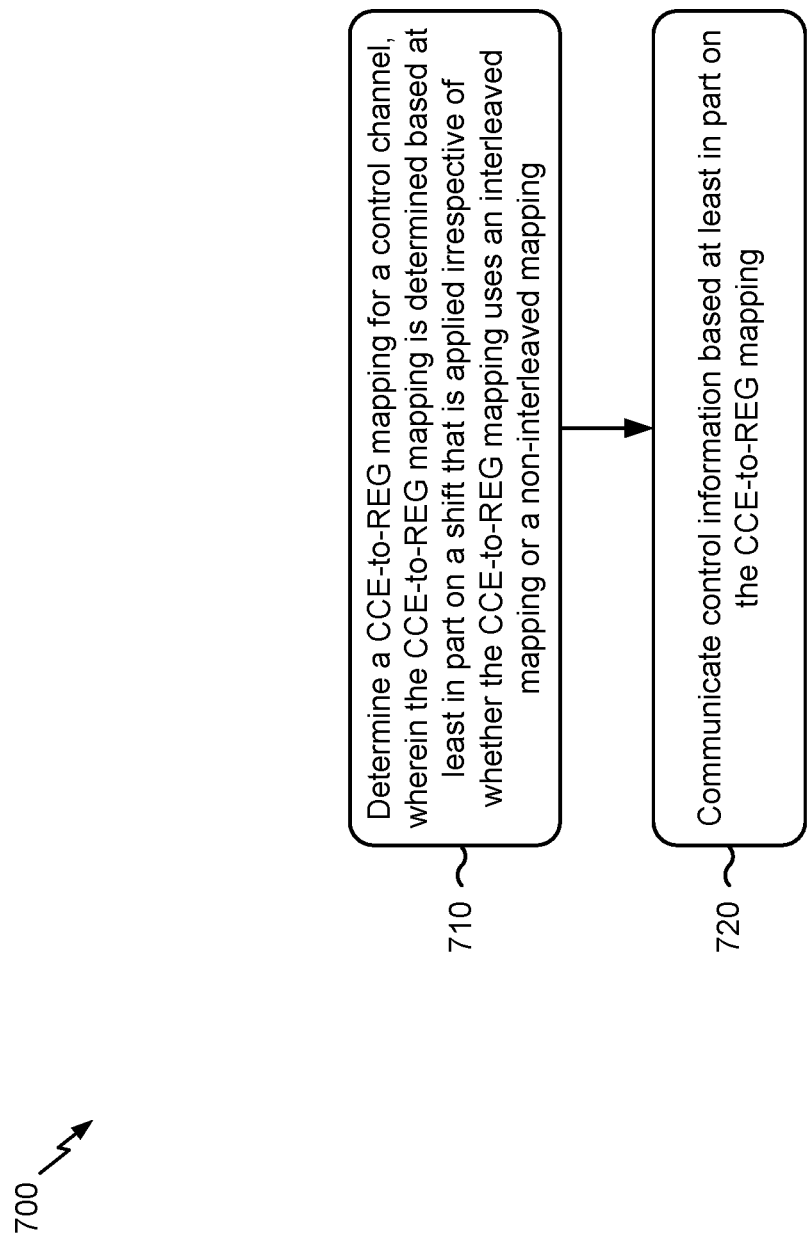
FIG. 7 is a diagram illustrating an example process performed, for example, by a wireless communication device, in accordance with various aspects of the present disclosure.

FIG. 7 is a diagram illustrating an example process 700 performed, for example, by a wireless communication device, in accordance with various aspects of the present disclosure. Example process 700 is an example where a wireless communication device (e.g., BS 110, UE 120, and/or the like) performs determination of a control channel element to resource element group mapping using a shift.

As shown in FIG. 7, in some aspects, process 700 may include determining a control channel element to resource element group (CCE-to-REG) mapping for a control channel, wherein the CCE-to-REG mapping is determined based at least in part on a shift that is applied irrespective of whether the CCE-to-REG mapping uses an interleaved mapping or a non-interleaved mapping (block 710). For example, the wireless communication device (e.g., using controller/processor 240, controller/processor 280, and/or the like) may determine a CCE-to-REG mapping for a control channel (e.g., a PDCCH). The CCE-to-REG mapping may be determined based at least in part on a shift (e.g., a cyclic redundancy check shift) that is applied irrespective of whether the CCE-to-REG mapping uses an interleaved mapping or a non-interleaved mapping.

As shown in FIG. 7, in some aspects, process 700 may include communicating control information based at least in part on the CCE-to-REG mapping (block 720). For example, the wireless communication device (e.g., using controller/processor 240, transmit processor 220, TX MIMO processor 230, MOD 232, antenna 234, antenna 252, DEMOD 254, MIMO detector 256, receive processor 258, controller/processor 280, transmit processor 264, TX MIMO processor 266, MOD 254, DEMOD 232, MIMO detector 236, receive processor 238, and/or the like) may communicate control information based at least in part on the CCE-to-REG mapping. In some aspects, the wireless communication device may transmit and/or encode the control information. In some aspects, the wireless communication device may receive and/or decode the control information.

Process 700 may include additional aspects, such as any single aspect or any combination of aspects described below.

In some aspects, the CCE-to-REG mapping uses a non-interleaved mapping. In some aspects, the CCE-to-REG mapping is for a first cell, and misalignment of a CCE of the first cell with regard to a CCE of a second cell is permitted when determining the CCE-to-REG mapping. In some aspects, the shift is based at least in part on an identifier of the wireless communication device and a time-domain parameter. In some aspects, the time-domain parameter includes at least one of a slot index, a symbol index, or a subframe number. In some aspects, the shift varies over time based at least in part on the time-domain parameter. In some aspects, the shift is based at least in part on a combination of the time-domain parameter and the identifier.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a wireless communication device, in accordance with various aspects of the present disclosure. Example process 800 is an example where a wireless communication device (e.g., BS 110, UE 120, and/or the like) performs determining a control channel scrambling sequence.

As shown in FIG. 8, in some aspects, process 800 may include determining a scrambling sequence for a control channel, wherein the scrambling sequence is determined using a same identifier irrespective of whether the control channel is associated with a cell radio network temporary identifier (C-RNTI) or another type of RNTI, and wherein the scrambling sequence is determined based at least in part on an identifier associated with the wireless communication device and a value associated with an RNTI of the wireless communication device (block 810). For example, a wireless communication device (e.g., using controller/processor 240, controller/processor 280, and/or the like) may determine a scrambling sequence for a control channel. In some aspects, the wireless communication device may initialize a scrambling sequence generator to determine the scrambling sequence. The scrambling sequence may be determined using a same identifier irrespective of whether the scrambling sequence is associated with a C-RNTI or another type of RNTI. The scrambling sequence may be determined based at least in part on an identifier associated with the wireless communication device and a value associated with an RNTI of the wireless communication device. In some aspects, the identifier associated with the wireless communication device may be $n_{ID}$ and the value associated with the RNTI may be $n_{RNTI}$.

As shown in FIG. 8, in some aspects, process 800 may include transmitting or receiving the control channel (block 820). For example, the wireless communication device (e.g., using controller/processor 240, transmit processor 220, TX MIMO processor 230, MOD 232, antenna 234, antenna 252, DEMOD 254, MIMO detector 256, receive processor 258, controller/processor 280, transmit processor 264, TX MIMO processor 266, MOD 254, DEMOD 232, MIMO detector 236, receive processor 238, and/or the like) may transmit or receive the control channel. In some aspects, the wireless communication device may scramble or modulate the control channel. In some aspects, the wireless communication device may descramble or demodulate the control channel.

Process 800 may include additional aspects, such as any single aspect or any combination of aspects described below.

In some aspects, when the control channel is in a search space of a common search space type, the identifier is a cell identifier. In some aspects, when the control channel is in a search space of a user equipment-specific search space type, the identifier is a configured value when the configured value has been configured, and the identifier is a cell identifier otherwise. In some aspects, when the control channel is associated with a control resource set that is configured using a physical broadcast channel, the identifier is a cell identifier. In some aspects, when the control channel is associated with a control resource set that is not configured using a physical broadcast channel, the identifier is a value when the value has been configured, and the identifier is a cell identifier when the value has not been configured.

In some aspects, when the control channel is in a search space of a user equipment-specific search space type, the identifier is a particular value when the particular value has been configured, and the identifier is a cell identifier when the particular value has not been configured. In some aspects, when the control channel is in a common search space, the identifier is a cell identifier and the value associated with the RNTI is zero. In some aspects, when the control channel is in a search space of a user equipment-specific search space type, the value associated with the RNTI is based at least in part on the C-RNTI.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a "processor" is implemented in hardware, firmware, or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a wireless communication device, comprising:
    determining a scrambling sequence initialization value for a control channel, wherein the scrambling sequence initialization value is determined based at least in part on an identifier associated with the wireless communication device and a value associated with a radio network temporary identifier (RNTI) of the wireless communication device, and wherein the identifier is a same identifier irrespective of whether the control channel is associated with a cell radio network temporary identifier (C-RNTI) or another type of RNTI; and
    transmitting or receiving the control channel.

2. The method of claim 1, wherein, when the control channel is in a search space of a common search space type, the identifier is a cell identifier.

3. The method of claim 1, wherein, when the control channel is in a search space of a user equipment-specific search space type, the identifier is a configured value when the configured value has been configured, and the identifier is a cell identifier otherwise.

4. The method of claim 1, wherein, when the control channel is in a search space of a common search space type, the identifier is a cell identifier and the value associated with the RNTI is zero.

5. The method of claim 1, wherein, when the control channel is in a search space of a user equipment-specific search space type, the value associated with the RNTI is based at least in part on the C-RNTI.

6. A method of wireless communication performed by a wireless communication device, comprising:
   determining a control channel element to resource element group (CCE-to-REG) mapping for a control channel;
   applying a shift to the CCE-to-REG mapping irrespective of whether the CCE-to-REG mapping uses an interleaved mapping or a non-interleaved mapping, wherein the shift is based at least in part on a time-varying shift value and a configurable identifier; and
   communicating control information based at least in part on applying the shift to the CCE-to-REG mapping.

7. The method of claim 6, wherein the CCE-to-REG mapping uses a non-interleaved mapping.

8. The method of claim 6, wherein the CCE-to-REG mapping is for a first cell, and wherein misalignment of a CCE of the first cell with regard to a CCE of a second cell is permitted when determining the CCE-to-REG mapping.

9. The method of claim 6, wherein the shift is based at least in part on an identifier of the wireless communication device and a time-domain parameter.

10. The method of claim 9, wherein the time-domain parameter includes at least one of a slot index, a symbol index, a subframe number, or a system frame number.

11. The method of claim 9, wherein the shift varies over time based at least in part on the time-domain parameter.

12. The method of claim 9, wherein the shift is based at least in part on a combination of the time-domain parameter and the identifier.

13. A wireless communication device for wireless communication, comprising:
   a memory; and
   one or more processors operatively coupled to the memory, the memory and the one or more processors configured to:
      determine a scrambling sequence initialization value for a control channel, wherein the scrambling sequence initializing value is determined based at least in part on an identifier associated with the wireless communication device and a value associated with radio network temporary identifier (RNTI) of the wireless communication device, and wherein the identifier is a same identifier irrespective of whether the control channel is associated with a cell radio network temporary identifier (C-RNTI) or another type of RNTI; and
      transmit or receive the control channel.

14. The wireless communication device of claim 13, wherein, when the control channel is in a search space of a common search space type, the identifier is a cell identifier.

15. The wireless communication device of claim 13, wherein, when the control channel is in a search space of a user equipment-specific search space type, the identifier is a configured value when the configured value has been configured, and the identifier is a cell identifier otherwise.

16. The wireless communication device of claim 13, wherein, when the control channel is in a search space of a common search space type, the identifier is a cell identifier and the value associated with the RNTI is zero.

17. The wireless communication device of claim 13, wherein, when the control channel is in a search space of a user equipment-specific search space type, the value associated with the RNTI is based at least in part on the C-RNTI.

18. A non-transitory computer-readable medium storing one or more instructions for wireless communication, the one or more instructions comprising:
   one or more instructions that, when executed by one or more processors of a wireless communication device, cause the one or more processors to:
      determine a scrambling sequence initialization value for a control channel, wherein the scrambling sequence initialization value is determined based at least in part on an identifier associated with the wireless communication device and a value associated with a radio network temporary identifier (RNTI) of the wireless communication device, and wherein the identifier is a same identifier irrespective of whether the control channel is associated with a cell radio network temporary identifier (C-RNTI) or another type of RNTI; and
      transmit or receive the control channel.

19. The non-transitory computer-readable medium of claim 18, wherein, when the control channel is in a search space of a common search space type, the identifier is a cell identifier.

20. The non-transitory computer-readable medium of claim 18, wherein, when the control channel is in a search space of a user equipment-specific search space type, the identifier is a configured value when the configured value has been configured, and the identifier is a cell identifier otherwise.

21. The non-transitory computer-readable medium of claim 18, wherein, when the control channel is in a search space of a common search space type, the identifier is a cell identifier and the value associated with the RNTI is zero.

22. The non-transitory computer-readable medium of claim 18, wherein, when the control channel is in a search space of a user equipment-specific search space type, the value associated with the RNTI is based at least in part on the C-RNTI.

* * * * *